March 25, 1947.  E. L. CLINE  2,417,860
THERMOSTATIC SWITCH
Filed May 20, 1942
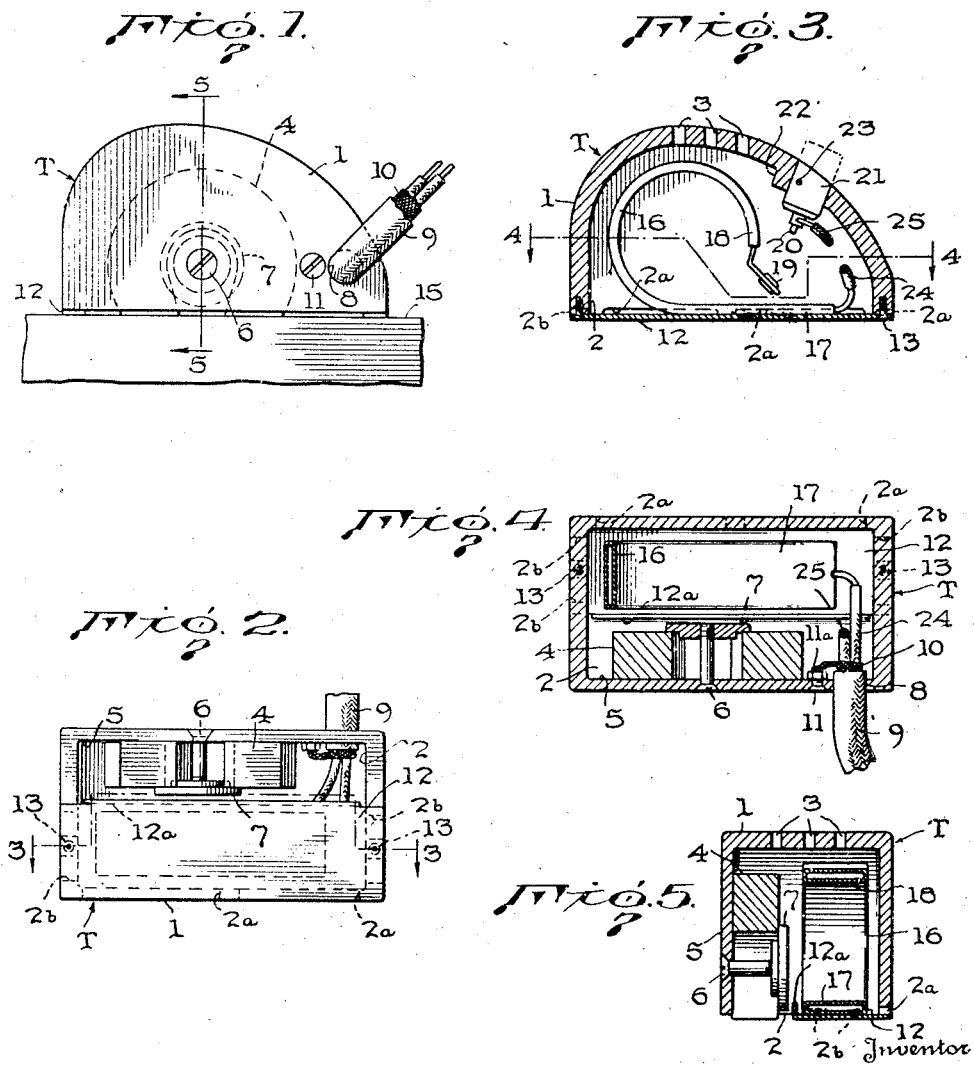
Inventor
Edwin L. Cline
By Bacon + Thomas
Attorneys Patented Mar. 25, 1947

2,417,860

UNITED STATES PATENT OFFICE 2,417,860

THERMOSTATIC SWITCH

Edwin L. Cline, Pasadena, Calif., assignor to Clayton Manufacturing Company, Alhambra, Calif.

Application May 20, 1942, Serial No. 443,834

18 Claims. (Cl. 200—140)

This invention relates to control devices and more particularly to temperature-responsive control devices.

Specifically, the invention relates to a thermostat including a permanent magnet adapting the same to adhere to any ferrous metal object. A thermostat of the character described herein is particularly useful, for example, in conducting engine dynamometer tests wherein it is desired to control the temperature of the engine cooling water by means of a thermostat control associated with a heat exchanger, the present thermostat affording the advantage of making it unnecessary to resort to immersion and other types of thermostats, which usually require some draining or loss of the engine cooling liquid during installation.

The principal object of the invention is to provide a thermostat device which is responsive to the temperature of a heated metallic object.

Another object of the invention is to provide a thermostat device requiring no mechanical connection to the apparatus which it controls, thus rendering the same readily attachable and detachable.

Another object of the invention is to provide a thermostat that will automatically retain itself in place upon any desired part of a ferrous object, for instance, a cylinder head or block of an internal combustion engine.

A still further object of the invention is to provide a thermostat device which is responsive to the temperature of a metal surface and which will complete a circuit to electrically control various apparatus associated with said metal surface.

A more specific object of the invention is to provide an automatic thermostat adapted to be used with an auxiliary cooling system for cooling the radiator liquid of a motor vehicle undergoing test, whereby the temperature of the radiator liquid can be maintained substantially constant and approximate that encountered in normal road driving; apparatus of the foregoing character being fully disclosed and described in my copending application Serial No. 443,833, filed May 20, 1942. It is to be understood, however, that the thermostat disclosed herein is generally useful and not restricted to the specific use given as a practical example of the utility of the invention.

Other objects of the invention will be apparent from the following description taken in conjunction with the accompanying drawings in which:

Fig. 1 is an elevational view of the thermostat device;

Fig. 2 is a view of the bottom of the thermostat device shown in Fig. 1;

Fig. 3 is a longitudinal sectional view taken on the line 3—3 of Fig. 2;

Fig. 4 is a horizontal sectional view taken on the line 4—4 of Fig. 3; and

Fig. 5 is a transverse sectional view taken on the line 5—5 of Fig. 1.

Referring now to the drawings, the thermostat device is generally indicated by the letter T and comprises a hollow non-ferrous housing (aluminum, Bakelite, etc.) 1 having an opening 2 in the base thereof. The interior of the housing is vented to the atmosphere by a plurality of openings 3 extending through the upper portion of the housing 1. A permanent magnet 4 of generally horseshoe shape is clamped against the interior of the side wall 5 of the housing 1 by means of a brass bolt 6 and a flanged nut 7, said bolt extending through said wall and core of said magnet and being threaded into said nut. The wall 5 is provided with an opening 8 through which a shielded electrical cable 9 extends. The shield 10 of the cable 9 is soldered to a brass bolt 11 mounted in the side wall 5 adjacent the opening 8, as indicated at 11ª in Fig. 4, to securely fasten the cable to the housing 1.

The large opening 2 in the base of the housing 1 is about half closed by a thin non-ferrous plate 12 of high heat-conducting material (copper) secured to the walls of the housing by screws 13, said plate being stiffened by a flange 12ª. The end faces of the legs of the magnet 4 lie in the same plane as the lower side of the plate 12 and are adapted to contact with a surface 15 on a motor block, cylinder head or other apparatus. The housing 2 is notched above the plate 12 as indicated at 2ª and 2ᵇ to provide further venting and greater sensitivity of the thermostat. The plate 12 carries a thermally-responsive element 16 in the form of a Bourdon tube, one end portion 17 of which is substantially flat and fixed to the plate 12 in heat-transferring relation for a substantial portion of its length. In this manner, heat is rapidly transferred to the liquid in the tube 16. The opposite end 18 of said Bourdon tube 16 is curved and carries a contact element 19. The tube 16 is filled with acetone or some other suitable liquid which will expand and contract in accordance with temperature changes. The contact 19 is adapted to engage a contact 20 projecting from a body of insulating material 21 mounted in a boss 22 formed on the interior of the housing 1. The body 21 is held in place by a pin 23. One wire 24 of the electrical cable 9 is connected to the extremity of the end portion 17 of the tube 16 and the second wire 25 thereof is secured to the contact 20. For certain uses a single-wire shielded cable may be used, the connection of the shield with the housing through bolt 11 serving as a ground connection, and the single wire (not shown) being connected with the contact 20.

It will be understood from the well known principle of operation of the Bourdon tube that when the liquid in the tube 16 expands, the curved portion 18 of the tube will tend to straighten out and in doing so will cause the contact 19 to engage the contact 20 and thereby complete the circuit to whatever apparatus may be associated with the thermostat.

When the thermostat T is used in connection with an auxiliary cooling system for the engine and radiator liquid, as illustrated and described, for example, in my copending application, supra, said thermostat may be positioned upon any ferrous part of the engine and will automatically adhere thereto because of the attraction of the permanent magnet 4. For the purposes of the present disclosure it is deemed unnecessary to describe said system herein inasmuch as the operation of the thermostat itself is sufficiently clear from the present disclosure and, moreover, the claims are not restricted to any particular use or environment. However, regardless of the environment in which the thermostat T is used, the housing vents 2ª, 2ᵇ and 3 will prevent the air within the housing 1 from becoming heated to such extent as to interfere with the accuracy of the thermostat.

When the thermostat T is used in conjunction with the auxiliary cooling apparatus generally referred to above, it is preferably calibrated so that when the liquid in the engine being tested reaches a a temperature of about 175° F., the Bourdon tube 16 expands and the thermostat contacts 19 and 20 are engaged. The thermostat T is further calibrated so that when the temperature of the engine liquid has dropped to about 165° F., the contacts 19 and 20 automatically separate due to contractive movement of the tube 16.

It will be understood that the thermostat may be calibrated to operate at different temperatures from those specifically recited herein to adapt the same for different uses. Calibration can be effected during the fabrication of the thermostat by adjusting the member 21 carrying the contact 20 relative to the contact 19. When the proper relationship has been established, a suitable hole is drilled through the housing 1 and member 21 and the pin 23 is inserted. Ordinarily the member 21 is cylindrical and extends beyond the periphery of the housing 1, as indicated by the dot-and-dash lines in Fig. 3. However, after suitable calibration, the excess material of the member 21 is removed as by grinding the same down until it is flush with the outer periphery of the housing 1, as shown in full lines.

The adaptability of the thermostat to be calibrated for various temperature ranges obviously enables the same to be used for controlling various types of apparatus and it is to be clearly understood that the present thermostat is not limited for use in engine testing but is capable of wide and general use.

It will be understood that the thermostat T may be positioned upon non-ferrous surfaces and operate equally satisfactorily, although the permanent magnet 4 provides the added feature of firmly, but detachably, holding said thermostat in place when positioned upon a ferrous object.

It will also be understood that various changes may be made in the details of construction of the thermostat device disclosed herein without departing from the spirit of the invention or the scope of the appended claims.

What I claim is:

1. A thermostat device comprising: a body; a permanent magnet secured to said body and including portions arranged to magnetically retain said body upon a ferrous object; and thermally-responsive means carried by said body, including a surface lying in substantially the same plane as said portions of said permanent magnet, whereby said thermally responsive means is actuated in accordance with the thermal changes in said ferrous object.

2. A thermostat comprising: a hollow housing; a thermally-responsive element in said housing; and a permanent magnet associated with said housing for mounting said housing upon a given portion of a ferrous object with the thermally responsive element exposed to the heat at said given portion of said ferrous object, whereby said thermally responsive element is actuated in accordance with the thermal changes in said given portion of said ferrous object.

3. A thermostat comprising: a hollow housing; a permanent magnet of generally horseshoe shape mounted within said housing; and thermally-responsive means within said housing including a heat conducting element, said permanent magnet being capable of supporting said thermostat housing upon a ferrous body with said heat conducting element in thermal contact with said ferrous body, whereby said thermally-responsive means is operated in accordance with the temperature changes in said ferrous body.

4. A thermostat device comprising: a hollow non-ferrous housing; a permanent horseshoe magnet in said housing having the ends of the legs thereof substantially flush with the base of said housing; a bolt extending through a side wall of said housing and through the core of said permanent horseshoe magnet; a nut threaded upon said bolt clamping said permanent horseshoe magnet against said side wall of said housing; and thermally-responsive means in said housing.

5. A thermostat device comprising: a hollow housing; thermally-responsive means mounted within said housing including a portion adapted to contact a ferrous object, said housing having vent openings to prevent the air within said housing from becoming excessively heated and affecting the accuracy of said thermally-responsive means; and a permanent magnet secured to said housing for mounting the same upon any desired portion of a ferrous object with said portion of said thermally responsive means in contact with said desired portion of said ferrous object, whereby said thermally responsive means will be actuated in accordance with thermal changes in said portion of said ferrous object.

6. A thermostat device comprising: a hollow housing open at its base; a permanent magnet in said housing for mounting said housing upon a given portion of a ferrous object; means securing said permanent magnet to said housing; thermally-responsive means within said housing including a heat transfer plate partially closing said opening; and means securing said thermostat to said housing with said heat transfer plate in approximately the same plane as the base of said housing.

7. A thermostat device comprising: a hollow housing open at its base; a plate secured to said housing and partially closing said opening, said plate having high heat-conducting characteristics; and thermally-responsive means in said housing in direct surface contact with said plate and operable in accordance with the thermal changes in said plate.

8. A thermostat device comprising: a hollow housing open at its base; a plate secured to said housing and partially closing said opening, said plate having high heat-conducting characteristics; thermally-responsive means in said housing in direct surface contact with said plate; and a permanent magnet secured to said housing for detachably mounting the same upon a ferrous metal object with said plate in contact with said ferrous metal object, whereby said thermally responsive means is actuated in accordance with the thermal changes in said ferrous metal object.

9. A thermostat device comprising: a housing open at its base; a permanent magnet of the horseshoe type mounted within said housing with the end surfaces of the legs thereof substantially flush with the lowermost portion of said housing; a plate secured to the base of said housing, said plate being arranged so that the end surfaces of said legs of said permanent magnet lie in a plane substantially common to said plate; and thermally-responsive means in said housing in contact with said plate.

10. A thermostat device comprising: a hollow housing; a plate secured to said housing; a Bourdon tube in said housing having a straight portion fixedly secured to and in contact with said plate and a curved flexible portion carrying a contact; a second contact carried by said housing and adapted to be engaged by the contact of said Bourdon tube; and a permanent magnet secured to said housing for mounting the same upon a ferrous body with said plate contacting said ferrous body, whereby said Bourdon tube is actuated in accordance with the thermal changes in said ferrous body.

11. A thermostat device comprising: a hollow housing; a Bourdon tube mounted in said housing and having a curved portion carrying a contact; a second contact mounted in said housing and adapted to be engaged by the contact of said Bourdon tube, said housing having an aperture; a shielded cable having one end thereof extending through said aperture, the wires of said cable being secured to said contacts, respectively; and means anchoring the shield of said cable to said housing to secure said cable to said housing.

12. A thermostat comprising: a hollow housing having an opening at its base; a permanent horseshoe magnet carried by said housing with the ends of the legs thereof projecting to a point below the base of said housing; a plate secured to said housing in substantially the same plane as the ends of said legs and substantially closing said opening; a Bourdon tube in said housing having a straight portion secured to said plate and a curved portion carrying a contact; a second contact mounted in said housing and adapted to be engaged by the contact of said Bourdon tube, said housing having an aperture; and a cable having one end thereof extending through said aperture, the wires of said cable being secured to said contacts, respectively.

13. A thermostat comprising: a hollow housing having an opening at its base; a permanent horseshoe magnet carried by said housing with the ends of the legs thereof projecting to a plane below the base of said housing; a plate secured to said housing and substantially closing said opening, said plate having the outer side thereof in substantially the same plane as the ends of the legs of said magnet; a Bourdon tube in said housing having a straight portion secured to said plate and a curved portion carrying a contact; a second contact mounted in said housing and adapted to be engaged by the contact of said Bourdon tube, said housing having an aperture; a shielded cable having one end thereof extending through said aperture, the wires of said cable being secured to said contacts, respectively; and means anchoring the shield of said cable to said housing to secure said cable to said housing.

14. A thermostat device comprising: a hollow body; a permanent magnet secured to said body arranged to retain said body upon a ferrous object; and thermally-responsive switch means within said body including a fixed contact, a plate adapted to be held in thermal contact with said ferrous object by said magnet, and a thermally actuable contact carrying element mounted upon said plate, whereby said switch means is actuated in accordance with the thermal changes transmitted to said plate from said ferrous object.

15. A thermostat device comprising: a hollow housing; switch means including a fixed contact in said housing, a thermally responsive element, and a movable contact carried by said element engageable with said fixed contact; and a permanent magnet operatively arranged relative to said housing for mounting said housing upon a given portion of a ferrous object so that said thermally-responsive element is influenced by and actuated in accordance with the thermal changes in said ferrous object, whereby said switch means is actuated in accordance with the thermal changes in said given portion of said ferrous object.

16. A thermostat device comprising: a hollow non-ferrous housing; a permanent horseshoe magnet in said housing having the ends of the legs thereof substantially flush with the base of said housing; a bolt extending through a side wall of said housing and through the core of said permanent horseshoe magnet; a nut threaded upon said bolt clamping said permanent horseshoe magnet against said side wall of said housing; and switch means in said housing including a fixed contact, a plate, a thermally-responsive element mounted upon said plate, and a movable contact carried by said thermally responsive element and adapted to be engaged with said first-mentioned contact, said permanent magnet being adapted to hold said thermostat device upon any desired portion of a ferrous object with said plate in thermal contact with said portion of said ferrous object, whereby said switch means is actuated in accordance with the thermal changes in said portion of said ferrous object.

17. A thermostat device comprising: a hollow housing; switch means within said housing including a fixed contact, a thermally-responsive element and a movable contact carried by said element adapted to engage said fixed contact, said housing having vent openings to prevent the air within said housing from becoming excessively heated and affecting the accuracy of said thermally-responsive switch means; and a permanent magnet secured to said housing for mounting the same upon any desired portion of a ferrous object so that said thermally-responsive element is inffluenced by and actuated in accordance with the thermal changes in said portion of said ferrous object, whereby said switch means is actuated in accordance with thermal changes in said portion of said ferrous object.

18. A thermostat device comprising: a hollow housing; a permanent horseshoe magnet in said housing having the ends of the legs thereof substantially flush with the base of said housing; means securing said permanent horseshoe magnet in position in said housing; and switch means in said housing including a fixed contact, a plate, a thermally responsive element mounted upon said plate, and a movable contact carried by said thermally responsive element and adapted to be engaged with said first mentioned contact, said permanent magnet being adapted to hold said thermostat device upon any desired portion of a ferrous object with said plate in thermal contact with said portion of said ferrous object, whereby said switch means is actuated in accordance with the thermal changes in said portion of said ferrous object.

EDWIN L. CLINE.

REFERENCES CITED

The following references are of record in the file of this patent:

UNITED STATES PATENTS

| Number | Name | Date |
| --- | --- | --- |
| 1,932,143 | Piercy | Oct. 24, 1933 |
| 2,061,346 | Briggs | Nov. 17, 1936 |
| 1,997,604 | Stewart | Apr. 16, 1935 |
| 2,234,982 | Ross | Mar. 18, 1941 |
| 1,115,810 | Gray | Nov. 3, 1914 |